US012671778B2

(12) United States Patent
Okuno

(10) Patent No.: US 12,671,778 B2
(45) Date of Patent: *Jun. 30, 2026

(54) INFORMATION PROCESSING APPARATUS AND DEVICE MANAGEMENT METHOD FOR PROHIBITING NEW USER OF PRINTING DEVICE FROM ACCESSING USER INFORMATION OF FORMER USER

(71) Applicant: BROTHER KOGYO KABUSHIKI KAISHA, Nagoya (JP)

(72) Inventor: Tetsuya Okuno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 215 days.

This patent is subject to a terminal disclaimer.

(21) Appl. No.: 18/455,722

(22) Filed: Aug. 25, 2023

(65) Prior Publication Data

US 2024/0080404 A1 Mar. 7, 2024

(30) Foreign Application Priority Data

Aug. 26, 2022 (JP) ................................. 2022-134685

(51) Int. Cl.
 *H04N 1/00* (2006.01)
 *H04N 1/44* (2006.01)
(52) U.S. Cl.
 CPC ................................. *H04N 1/4406* (2013.01)
(58) Field of Classification Search
 None
 See application file for complete search history.

(56) References Cited

U.S. PATENT DOCUMENTS

2012/0044539 A1* 2/2012 Yamaguchi .......... H04N 1/4433
                                                         358/1.16
2013/0070288 A1* 3/2013 Muranaka ............. G06F 3/1204
                                                         358/1.15

(Continued)

FOREIGN PATENT DOCUMENTS

JP     2011113241 A  *  6/2011
JP     2012-44486 A      3/2012

(Continued)

OTHER PUBLICATIONS

Extended European Search Report issued in corresponding application EP 23193123.9, Feb. 2, 2024.

(Continued)

*Primary Examiner* — Pawandeep Dhingra
(74) *Attorney, Agent, or Firm* — Merchant & Gould P.C.

(57) ABSTRACT

An information processing apparatus includes: a communication interface configured to communicate with a printing device via a network; and a controller configured to manage the printing device on the basis of user information of a corresponding user. The printing device is configured to perform image formation on a printing medium. The controller is further configured to perform: (a) acquiring individual information identifying the printing device; (b) outputting an initialization command to the printing device identified by the individual information acquired in the (a) acquiring, and (c) prohibiting, in response to outputting the initialization command to the identified printing device in the (b) outputting, access to the user information of the first user from a second user different from the first user. The initialization command is a command instructing the identified printing device to perform information initialization for terminating use of the identified printing device by a first user.

6 Claims, 10 Drawing Sheets

(56) References Cited

U.S. PATENT DOCUMENTS

| | | | | |
|---|---|---|---|---|
| 2014/0185092 A1* | 7/2014 | Takasu | ............... | H04N 1/00334 |
| | | | | 358/1.15 |
| 2014/0320883 A1* | 10/2014 | Ichida | ................... | G06F 3/1238 |
| | | | | 358/1.14 |
| 2015/0015908 A1* | 1/2015 | Tanaka | ............... | H04N 1/32106 |
| | | | | 358/1.14 |
| 2016/0105570 A1* | 4/2016 | Katoh | ................... | G06F 3/1285 |
| | | | | 358/1.15 |
| 2018/0234840 A1* | 8/2018 | Nakamura | ............ | H04W 48/16 |
| 2022/0006920 A1* | 1/2022 | Mukai | ................. | H04N 1/0048 |

FOREIGN PATENT DOCUMENTS

| | | |
|---|---|---|
| JP | 2019-129342 A | 8/2019 |
| JP | 2020-140223 A | 9/2020 |

OTHER PUBLICATIONS

Mutemwa Muyowa et al: "Cyber Security Threats and Mitigation Techniques for Multifunctional Devices", 2018 Conference on Information Communications Technology and Society(ICTAS), IEEE, pp. 1-6, Mar. 8, 2018.
Office Action issued in corresponding European Patent Application No. 23193123.9, Nov. 12, 2024.

* cited by examiner

COMPARATIVE EXAMPLE

PRESENT EMBODIMENT

FIG. 4

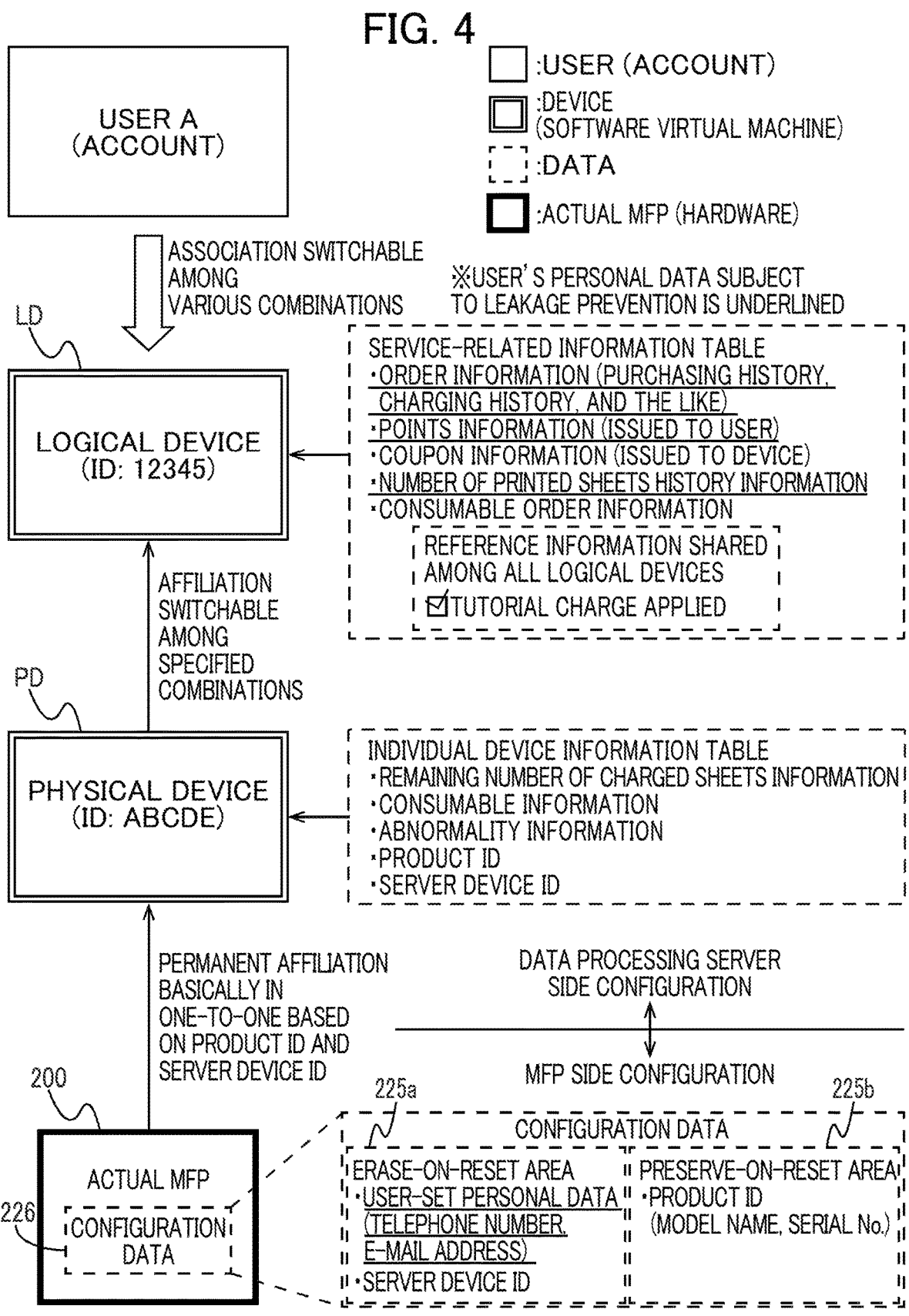

□ :USER (ACCOUNT)

☐ :DEVICE
(SOFTWARE VIRTUAL MACHINE)

⌐ ¬ :DATA
└ ┘

■ :ACTUAL MFP (HARDWARE)

USER A
(ACCOUNT)

ASSOCIATION SWITCHABLE
AMONG
VARIOUS COMBINATIONS

※USER'S PERSONAL DATA SUBJECT
TO LEAKAGE PREVENTION IS UNDERLINED

LD

LOGICAL DEVICE
(ID: 12345)

SERVICE-RELATED INFORMATION TABLE
・ORDER INFORMATION (PURCHASING HISTORY,
 CHARGING HISTORY, AND THE LIKE)
・POINTS INFORMATION (ISSUED TO USER)
・COUPON INFORMATION (ISSUED TO DEVICE)
・NUMBER OF PRINTED SHEETS HISTORY INFORMATION
・CONSUMABLE ORDER INFORMATION

REFERENCE INFORMATION SHARED
AMONG ALL LOGICAL DEVICES
☑TUTORIAL CHARGE APPLIED

AFFILIATION
SWITCHABLE
AMONG
SPECIFIED
COMBINATIONS

PD

PHYSICAL DEVICE
(ID: ABCDE)

INDIVIDUAL DEVICE INFORMATION TABLE
・REMAINING NUMBER OF CHARGED SHEETS INFORMATION
・CONSUMABLE INFORMATION
・ABNORMALITY INFORMATION
・PRODUCT ID
・SERVER DEVICE ID

PERMANENT AFFILIATION
BASICALLY IN
ONE-TO-ONE BASED
ON PRODUCT ID AND
SERVER DEVICE ID

DATA PROCESSING SERVER
SIDE CONFIGURATION

MFP SIDE CONFIGURATION

200

ACTUAL MFP

226    CONFIGURATION
DATA

225a    CONFIGURATION DATA    225b

ERASE-ON-RESET AREA
・USER-SET PERSONAL DATA
 (TELEPHONE NUMBER,
 E-MAIL ADDRESS)
・SERVER DEVICE ID

PRESERVE-ON-RESET AREA
・PRODUCT ID
 (MODEL NAME, SERIAL No.)

FIG. 6

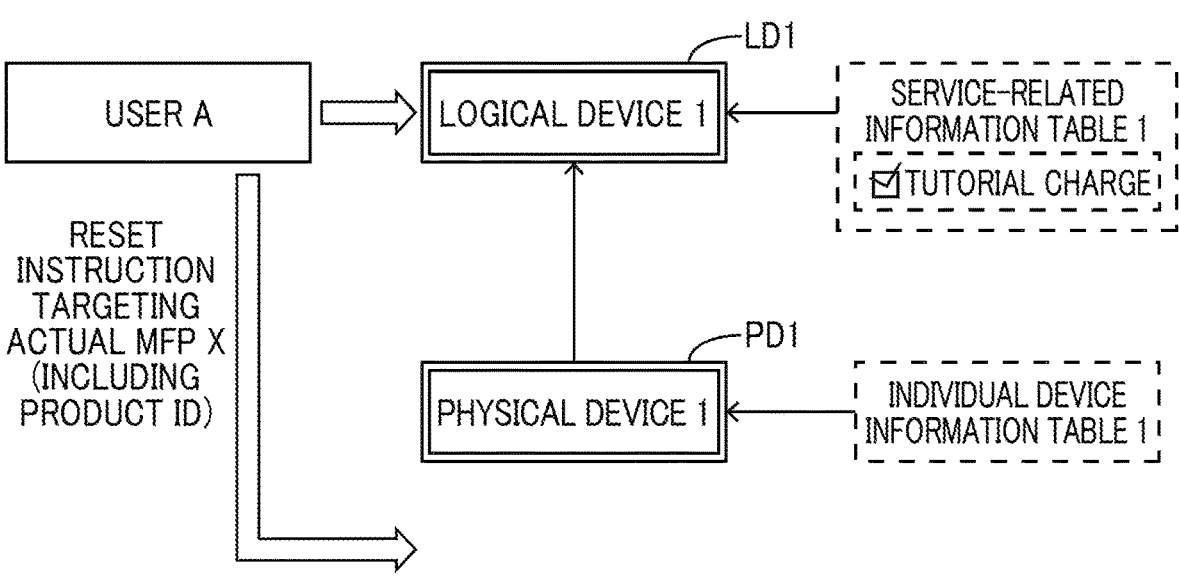

USER A ⟹ LOGICAL DEVICE 1 (LD1)

SERVICE-RELATED INFORMATION TABLE 1
☑ TUTORIAL CHARGE

RESET INSTRUCTION TARGETING ACTUAL MFP X (INCLUDING PRODUCT ID)

PHYSICAL DEVICE 1 (PD1)

INDIVIDUAL DEVICE INFORMATION TABLE 1

DATA PROCESSING SERVER SIDE

INITIALIZATION COMMAND

ACTUAL MFP X — 200

RESET IN ACCORDANCE WITH COMMAND  225a

CONFIGURATION DATA

ERASE-ON-RESET AREA
• (ERASED)
• (ERASED)

PRESERVE-ON-RESET AREA
• PRODUCT ID (INVARIABLE)

225b

USER-SET PERSONAL DATA AND SERVER DEVICE ID-1 ARE ERASED

INFORMATION PROCESSING APPARATUS AND DEVICE MANAGEMENT METHOD FOR PROHIBITING NEW USER OF PRINTING DEVICE FROM ACCESSING USER INFORMATION OF FORMER USER

REFERENCE TO RELATED APPLICATIONS

This application claims priority from Japanese Patent Application No. 2022-134685 filed on Aug. 26, 2022. The entire content of the priority application is incorporated herein by reference.

BACKGROUND ART

In a conventional image forming device, the hard disk drive in the image forming device stores unique information specific to the image forming device itself, and changeable information that is modified in response to the erasure of registration data.

DESCRIPTION

In the technology used in the conventional image forming device, the registration data is erased from the image forming device once the term of the service contract has expired. At this time, a serial number and model number constituting the unique information is not erased from the hard disk drive, while the changeable information is erased. However, if the image forming device is connected to a server and is managed by the server through user information, for example, there is potential for this user information to be leaked from the server after the service contract has expired despite the fact that the above erasure process on the image forming device is performed.

In view of the foregoing, it is an object of the present disclosure to provide an information processing apparatus and a device management method that can suppress leakage of user information after the termination of use of the image forming device.

In order to attain the above and other objects, according to one aspect, the present disclosure provides an information processing apparatus including a communication interface and a controller. The communication interface is configured to communicate with a printing device via a network. The printing device is configured to perform image formation on a printing medium. The controller is configured to manage the printing device on the basis of user information of a corresponding user. The controller is further configured to perform: (a) acquiring individual information identifying the printing device; (b) outputting an initialization command to the printing device identified by the individual information acquired in the (a) acquiring, the initialization command being a command instructing the identified printing device to perform information initialization for terminating use of the identified printing device by a first user; and (c) prohibiting, in response to outputting the initialization command to the identified printing device in the (b) outputting, access to the user information of the first user from a second user different from the first user.

The above information processing apparatus according to the present disclosure manages a printing device on the basis of at least user information of the user of the printing device. If use of the printing device by a first user ends, the information processing apparatus suppresses the user information of the first user from being leaked.

That is, the controller acquires individual information identifying the printing device in the (a) acquiring. On the basis of the individual information acquired in the (a) acquiring, the controller performs the (b) outputting. In the (b) outputting, the controller outputs an initialization command to the printing device identified by the individual information acquired in the (a) acquiring. The initialization command is a command instructing the printing device to perform information initialization for terminating use of the identified printing device by the first user. In response to outputting the initialization command to the identified printing device in the (b) outputting, the controller prohibits a second user different from the first user from accessing the user information of the first user.

According to the above configuration, even if use of a printing device by a user ends and the ownership of the printing device is transferred from this user to a new user, the information processing apparatus of the present disclosure does not allow the new user to access the user information of the former user, thereby suppressing the user information of the former user from being leaked to the new user.

The above configuration is safer in ensuring security than the conventional technology because, even if the information initialization fails on the identified printing device, the user information of the first user is suppressed from being leaked provided that the initialization command has been outputted.

According to another aspect, the present disclosure provides a device management method for an information processing apparatus. The information processing apparatus is configured to manage a printing device on the basis of user information of a corresponding user. The printing device is configured to perform image formation on a printing medium. The device management method includes: (a) acquiring individual information identifying the printing device; (b) outputting an initialization command to the printing device identified by the individual information acquired in the (a) acquiring, the initialization command being a command instructing the identified printing device to perform information initialization for terminating use of the identified printing device by a first user; and (c) prohibiting, in response to outputting the initialization command to the identified printing device in the (b) outputting, access to the user information of the first user from a second user different from the first user.

The above information processing apparatus according to the present disclosure manages a printing device on the basis of at least user information of the user of the printing device. If use of the printing device by a first user ends, the information processing apparatus suppresses the user information of the first user from being leaked.

That is, the controller acquires individual information identifying the printing device in the (a) acquiring. On the basis of the individual information acquired in the (a) acquiring, the controller performs the (b) outputting. In the (b) outputting, the controller outputs an initialization command to the printing device identified by the individual information acquired in the (a) acquiring. The initialization command is a command instructing the printing device to perform information initialization for terminating use of the identified printing device by the first user. In response to outputting the initialization command to the identified printing device in the (b) outputting, the controller prohibits a second user different from the first user from accessing the user information of the first user.

According to the above configuration, even if use of a printing device by a user ends and the ownership of the printing device is transferred from this user to a new user, the information processing apparatus of the present disclosure does not allow the new user to access the user information of the former user, thereby suppressing the user information of the former user from being leaked to the new user.

The above configuration is safer in ensuring security than the conventional technology because, even if the information initialization fails on the identified printing device, the user information of the first user is suppressed from being leaked provided that the initialization command has been outputted.

According to the above configurations, the leakage of user information can be suppressed following termination of use.

FIG. 4 is a view illustrating one example of a specific association configuration between a physical device and a logical device.

FIG. 6 is a view illustrating changes in data and in an association configuration when a factory reset has been performed on the actual multifunction peripheral in response to an initialization command from a data processing server.

Figure 1:
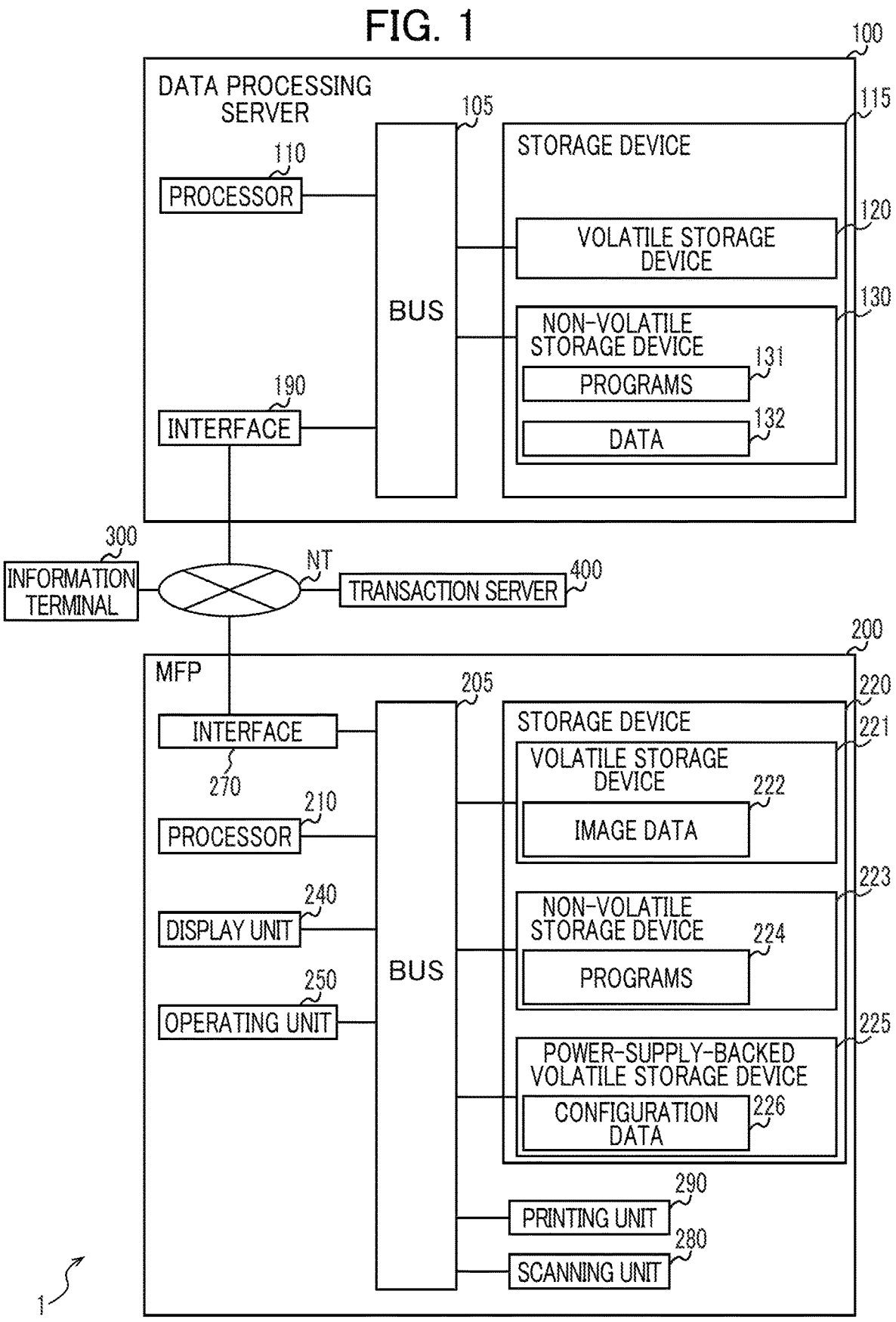
FIG. 1 is a functional block diagram illustrating the overall structure of a printing system.

FIG. 1 illustrates a printing system 1 according to one embodiment of the present disclosure. In the present embodiment, the printing system 1 provides a prepaid printing service in which users, i.e., customers can use the printing functions of a multifunction peripheral 200 by paying a fee.

1. Outline of Printing System

The printing system 1 illustrated in FIG. 1 includes a data processing server 100, the multifunction peripheral 200, an information terminal 300, and a transaction server 400. The data processing server 100, the multifunction peripheral 200, the information terminal 300, and the transaction server 400 are interconnected over a network NT to communicate with each other.

1-1. Data Processing Server

The data processing server 100 is a server that is installed and managed by the manufacturer of the multifunction peripheral 200, for example. The data processing server 100 includes a processor 110, a storage device 115, and an interface 190. The processor 110, the storage device 115, and the interface 190 are interconnected via a bus 105. The data processing server 100 is an example of the information processing apparatus.

The storage device 115 includes a volatile storage device 120, and a non-volatile storage device 130. The volatile storage device 120 is a DRAM, for example. The volatile storage device 120 stores therein data for managing the multifunction peripheral 200. The non-volatile storage device 130 is a hard disk drive or a solid-state drive, for example. The non-volatile storage device 130 has a program storage area 131 and a table storage area 132 for storing a data management table. The contents stored in these storage devices will be described later in detail.

The processor 110 is a device configured to perform data processing. The processor 110 is a CPU, for example. By executing a program stored in the program storage area 131, the processor 110 performs various processes illustrated in FIGS. 4 to 10 and the like described later, including processes for performing data communications with the information terminal 300, the multifunction peripheral 200, and the transaction server 400 which are connected to the network NT. The processor 110 is an example of the controller.

The interface 190 is a wired LAN interface or a wireless interface for communicating with other devices. The interface 190 is connected to the network NT via a wide-area communication interface (not illustrated). The interface 190 is an example of the communication interface.

1-2. Transaction Server

The transaction server 400 is a server that is installed at a company that provides various online services for settling online payments, for example. Although not illustrated in the drawings, the transaction server 400 includes a processor, a storage device, and an interface for connecting to the network NT.

1-3. Multifunction Peripheral

The multifunction peripheral 200 is owned by a service provider that provides the printing service described above, for example. The multifunction peripheral 200 is an example of the printing device. The multifunction peripheral 200 includes a scanning unit 280, a printing unit 290, a processor 210, a storage device 220, a display unit 240, a user-operable operating unit 250, and a communication interface 270. The scanning unit 280, the printing unit 290, the processor 210, the storage device 220, the display unit 240, the operating unit 250, and the communication interface 270 are interconnected via a bus 205.

The storage device 220 includes a volatile storage device 221, a non-volatile storage device 223, and a power-supply-backed volatile storage device 225. The volatile storage device 221 is DRAM, for example. The volatile storage device 221 has a data storage area 222 that can store image data. The non-volatile storage device 223 is flash memory, for example. The non-volatile storage device 223 has a program storage area 224. Among the various programs stored in the program storage area 224, a management process program related to execution of data management and process sequences described later in FIGS. 4 through 10 and the like, is prestored as firmware, for example. The power-supply-backed volatile storage device 225 is NVRAM, for example. The power-supply-backed volatile storage device 225 is provided with its own battery power supply and can preserve stored content even after the main power for the multifunction peripheral 200 has been turned off. The power-supply-backed volatile storage device 225 has a configuration data storage area 226 for storing configuration data described later in a partially erasable or rewritable manner. The power-supply-backed volatile storage device 225 is an example of the storage unit.

The processor 210 is a device configured to perform data processing. The processor 210 is a CPU, for example. The processor 210 executes the above-described management process program stored in the program storage area 224. The processor 210 also executes print control programs stored in the program storage area 224 for performing various print control in the multifunction peripheral 200. By executing the programs stored in the program storage area 224, the processor 210 can control the printing unit 290 to print images based on image data transmitted from the information terminal 300.

The display unit 240 is a liquid crystal display, for example. The operating unit 250 is a device configured to receive user operations. By operating the operating unit 250, the user can input various instructions into the multifunction peripheral 200. The communication interface 270 is a wired or wireless network interface for communicating with other devices. The communication interface 270 is connected to the network NT via a wide-area communication interface (not illustrated).

The scanning unit 280 is configured to optically read a scanning target such as a document using photoelectric conversion elements such as a CCD or a CMOS, and to generate scan data representing an image of the read scanning target.

The printing unit 290 is configured to pick up a sheet from a feed tray of the printing unit 290 and to print an image on the sheet according to a prescribed method while conveying the sheet using a conveying mechanism (not illustrated) of the printing unit 290. The following specification describes a case in which the printing unit 290 performs printing according to an inkjet method. The sheet is an example of the printing medium.

1-4. Information Terminal

The information terminal 300 in the present example is an information terminal (terminal device) such as a desktop personal computer, a tablet computer, or a smartphone possessed by the user. The information terminal 300 is connected to the network NT through, for example, wireless communication. Although not illustrated in the drawings, the information terminal 300 includes a processor, a storage device, and an interface for connecting to the network NT. In this example, the processor of the information terminal 300 utilizes an operating system (OS) provided with universal printing capabilities, such as Mopria and AirPrint. An application program for utilizing the printing service described above is preinstalled in the information terminal 300. The application program is executed and developed on the OS. Note that the information terminal 300 is not limited to the above-mentioned desktop personal computer, tablet computer, or smartphone, but other types of information terminals may be used as the information terminal 300.

2. Logical Devices and Physical Devices

As described above, the printing system 1 according to the present embodiment provides a prepaid printing service in which users pay a fee to use the printing functions of the multifunction peripheral 200. Specifically, in accordance with a service contract (a service agreement), a user (i.e., a customer) utilizes the printing service using a multifunction peripheral 200 possessed by the provider of the printing service or purchased by the user. In the printing service, the user pre-purchases via the information terminal 300 authorization to print a prescribed number of sheets on the multifunction peripheral 200. In other words, a usage-based system is employed in the printing service in which the user can print only the prescribed number of sheets stipulated in the specific printing service plan that the user has ordered. In this system, the data processing server 100 directly receives an order for a printing service from the information terminal 300, the transaction server 400 indirectly handles an online payment for that order, and the data processing server 100 applies the printing service to the multifunction peripheral 200 once payment has been settled.

Figure 2:
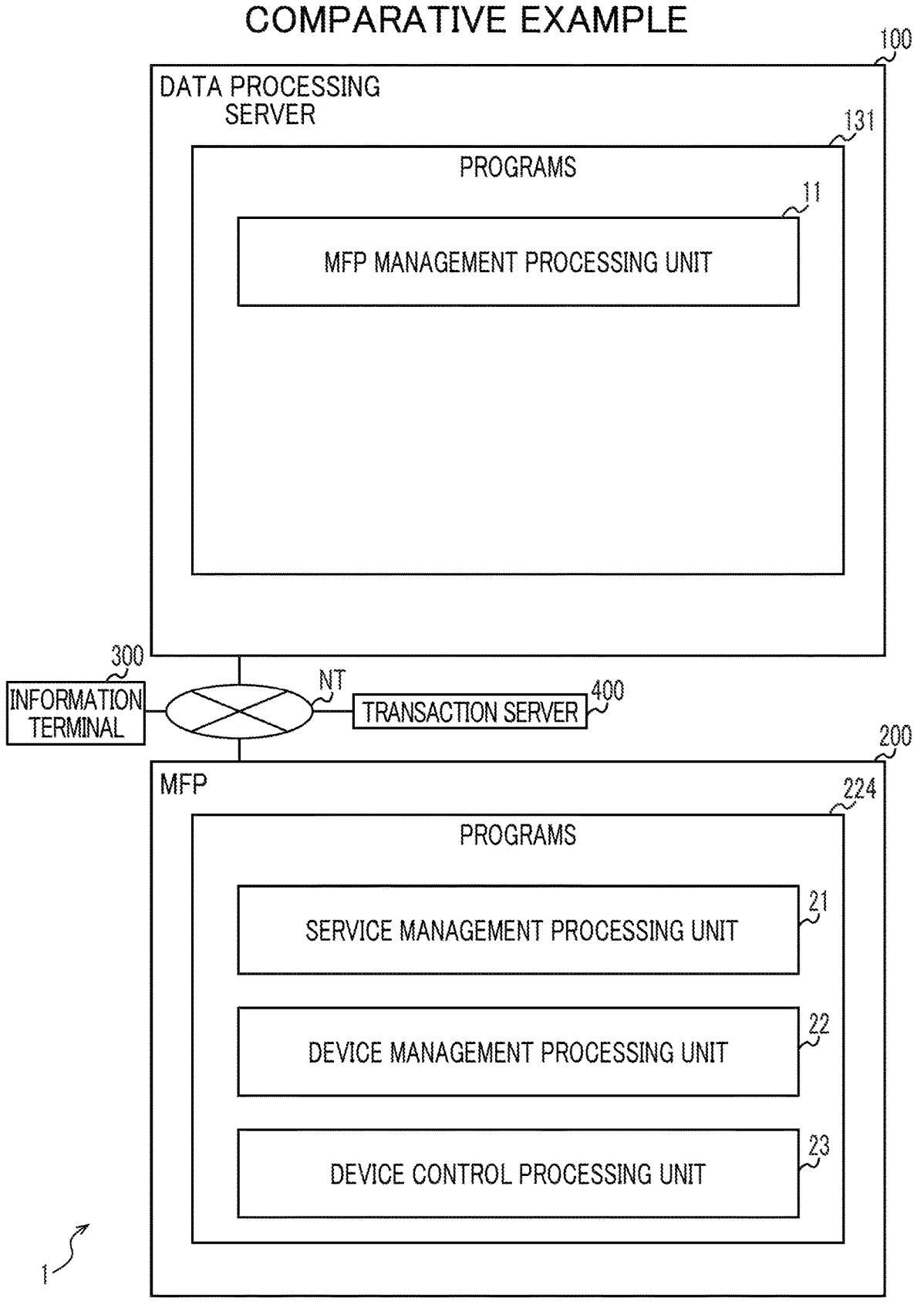
FIG. 2 is a view illustrating a shared configuration employed in a comparative example for sharing software processes between a data processing server and a multifunction peripheral.

To coordinate the above processes for the printing service, software processes might be shared between the data processing server 100 and multifunction peripheral 200, as in the comparative example shown in FIG. 2. In the example of FIG. 2, the data processing server 100 is provided with a program corresponding to an MFP management processing unit 11, and the multifunction peripheral 200 is provided with programs corresponding to a service management processing unit 21, a device management processing unit 22, and a device control processing unit 23. The MFP management processing unit 11 of the data processing server 100 comprehensively manages information on all multifunction peripherals 200 for which the data processing server 100 is responsible. The service management processing unit 21 of the multifunction peripheral 200 processes printing service orders received from contracted users of the multifunction peripheral 200 and manages related information. The device management processing unit 22 manages mechanical conditions, such as abnormalities or the status of consumables in the multifunction peripheral 200. The device control processing unit 23 performs processes related to basic device control, such as printing operations, input operations, and displays on the multifunction peripheral 200. The prepaid printing service described above can be implemented even when software processing is shared among the data processing server 100 and multifunction peripheral 200, as described above. However, this shared configuration provides little freedom for various settings and cannot flexibly handle reconfigurations and the like required when the ownership of the multifunction peripheral 200 is transferred among users, as will be described later.

Figure 3:
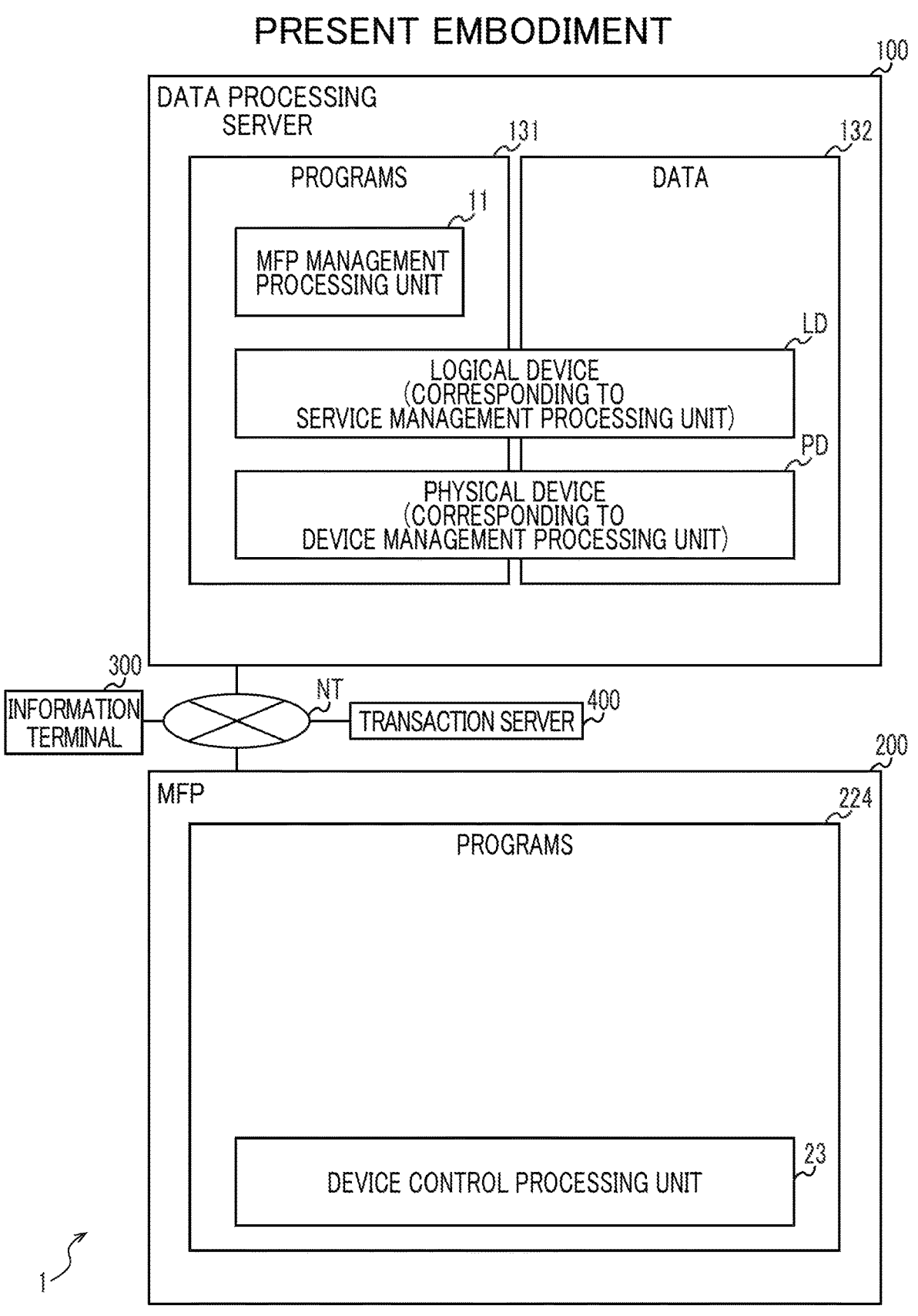
FIG. 3 is a view illustrating a shared configuration employed in the printing system for sharing software processes between a data processing server and a multifunction peripheral.

In contrast, this embodiment employs a shared configuration, such as that shown in FIG. 3, in which the functions of the service management processing unit 21 and device management processing unit 22 for each individual of the multifunction peripherals 200 are implemented on the data processing server 100 side. In this case, the data processing server 100 performs service management processes (corresponding to the functions of the service management processing units 21) using logical devices LD as virtual machines not tied to any specific multifunction peripheral 200 and performs device management processes (corresponding to the functions of the device management processing units 22) using physical devices PD, each of which is tied to a specific multifunction peripheral 200.

3. Configuration of Associations with the Logical Device and Physical Device FIG. 4 shows one sample configuration of specific associations with the logical device LD and physical device PD. First, the logical device LD itself is individually identified by an ID ("ID: 12345" in the example of FIG. 4) that is uniquely set and assigned to each service contract. In other words, the logical device LD is individually identified by an ID that uniquely identifies an individual service contract. The account of a contracted user registered on the data processing server 100 is associated with this logical device LD. Note that the associations of users to logical devices LD may be modified in various ways, such as linking a plurality of users to a single logical device LD or, conversely, associating a plurality of logical devices LD (i.e., a plurality of multifunction peripherals 200) to a single user.

The physical device PD itself is also individually identified by an ID ("ID: ABCDE" in the example of FIG. 4) uniquely set and assigned as appropriate. A single actual multifunction peripheral 200 is always permanently associated one-on-one with the physical device PD based on a combination of a product ID and server device ID described later and is in a state in which the mechanical conditions of the multifunction peripheral 200 can be referenced in real-time (hereinafter, being in a referable state will be referred to as "affiliated"). The physical device PD is switchably affiliated with logical devices LD according to specified combinations.

The logical device LD and physical device PD are used for managing data for their respective processes. The logical device LD manages various information related to printing services for associated users in a data table. Some specific examples of the information being managed are order information, points information, coupon information, number of printed sheets history information, consumable order information, and tutorial charge information. The user selects and orders printing authorization available for the multifunction peripheral 200 from among various charge service plans, such as 100 yen for 100 sheets and 250 yen for 300 sheets. Although not shown in the drawings, these service plans are prepared in advance on the data processing server 100. The data processing server 100 also awards the user service points equivalent to a certain percentage of the billing amount for an order. Coupons worth a certain amount of printing privileges are also issued free-of-charge at promotional events and the like. In the printing service described above, information on the user's order purchasing history and charging history is managed as the order information that is associated with separately generated receipt data (not shown); information on service points is managed as the points information; and information on coupons is managed as the coupon information. The number of printed sheets history information is used to manage the number of printed sheets under this printing service, i.e., how many of the number of printable sheets that the user charged (i.e., pre-purchased) for printing on the multifunction peripheral 200 have been actually printed. The consumable order information is used to manage details of the user's past orders for consumables such as ink cartridges used in the multifunction peripheral 200.

In addition to the paid orders and the use of coupons described above, the printing service in this example offers a tutorial charge plan as one form of charging the number of printable sheets (i.e., adding printing credit) for the multifunction peripheral 200. This tutorial charge is a one-time only charging authorization provided either free-of-charge or at a substantial discount for business purposes. The tutorial charge is intended for users who are using a new multifunction peripheral 200 for the first time, enabling the users to learn how to perform operations for charging the number of printable sheets (i.e., adding printing credit) or ensuring that their initial use of the multifunction peripheral 200 goes smoothly. In this embodiment, the target of the service points and coupons described above can be freely set to individual users, logical devices LD, or physical devices PD (i.e., multifunction peripherals 200) according to the type of business model. However, for the reasons described above, this tutorial charge is set so that the tutorial charge can be applied only once for the initial purchase of a single multifunction peripheral 200 newly offered for sale. Tutorial charge information indicates whether the tutorial charge has already been applied. Even if the ownership of an individual multifunction peripheral 200 is repeatedly transferred to different users, as will be described later, the tutorial charge information is passed on to the successive logical devices LD each time the multifunction peripheral 200 is reconfigured. Thus, the tutorial charge information is information shared among and referenced by these logical devices LD.

Various information related to mechanical conditions on the single multifunction peripheral 200 affiliated with the physical device PD is managed in an individual device information table. Specifically, the information managed in this table includes remaining number of charged sheets information, consumable information, abnormality information, product ID, and server device ID. The remaining number of charged sheets information is used to manage the number of remaining sheets that can be printed from among the number of printable sheets charged (added) by the user for the affiliated multifunction peripheral 200. The consumable information is used to manage the remaining quantities and statuses of consumables in the multifunction peripheral 200, such as ink cartridges. The abnormality information is used to manage unauthorized operations on the multifunction peripheral 200 or abnormalities and malfunctions that have occurred on the multifunction peripheral 200. The product ID is identification information uniquely assigned to the individual multifunction peripheral 200 affiliated with the physical device PD, as described above. In other words, the product ID is individual information individually identifying the multifunction peripheral 200. The server device ID is identification information that is uniquely assigned to this individual multifunction peripheral 200 when registering that multifunction peripheral 200 on the data processing server 100 to be managed by the data processing server 100, as will be described later. In this way, the ID for the physical device PD itself is uniquely associated with the combination of this product ID and server device ID, and accordingly, can be identified using this combination.

Configuration data is stored in the configuration data storage area 226 of the power-supply-backed volatile storage device 225 of the multifunction peripheral 200. As will be described later, the user of the multifunction peripheral 200 can perform a factory reset in this embodiment to return the multifunction peripheral 200 to its factory-shipped initial state. To do this, the user performs prescribed operations on the information terminal 300 for instructing the data processing server 100 to transmit an initialization command to the multifunction peripheral 200. For this reason, the configuration data storage area 226 for configuration data in the power-supply-backed volatile storage device 225 is divided into an erase-on-reset area 225*a* whose contents are erased (deleted) by a factory reset, and a preserve-on-reset area 225*b* whose contents are not erased (deleted) by a factory reset. The erase-on-reset area 225*a* stores the server device ID and user-set personal data such as telephone numbers and e-mail addresses. The user-set personal data is set separately by the user when using the multifunction peripheral 200.

The preserve-on-reset area 225*b* stores therein the product ID. For example, the product ID is a combination of information specifying the model name of the multifunction peripheral 200 and information specifying the serial number uniquely assigned to the multifunction peripheral 200 at the time of manufacture at the factory, and serves as identification information for uniquely identifying that multifunction peripheral 200 among the plurality of multifunction peripherals 200 distributed on the market or already in use. This product ID is treated as invariable storage information that must not be erased or modified under any circumstances.

The server device ID corresponds to a registration ID that the data processing server 100 uniquely generates and individually assigns to a registration application when a user registers to use the printing service described above for the multifunction peripheral 200. That is, after a factory-shipped multifunction peripheral 200 is newly purchased and used, the multifunction peripheral 200 may be repeatedly transferred and used among different users through a market for secondhand equipment, for example. Each time the multifunction peripheral 200 is transferred to a new user, the new user reconfigures the multifunction peripheral 200 to use the printing service, connecting to the data processing server 100 via the network NT and applying to register for the printing service. At this time, the data processing server 100 generates and assigns a new server device ID to the new registration application. In this way, the data processing server 100 can differentiate the same multifunction peripheral 200 for each registration and can set and identify a physical device PD that is uniquely associated with the combination of the product ID and server device ID.

Of the various data described above, the present embodiment suppresses data including order information, user-issued points information (i.e., points information on points issued to a user), and number of printed sheets history information (the information underlined in FIG. 4) from being leaked to users who have registered the same multifunction peripheral 200 at different times. That is, even when the multifunction peripheral 200 is transferred repeatedly among different users, this data is preserved as protected personal information associated with the user of the respective registration, while users are prohibited from accessing information for users of different registrations. Other data, such as the remaining number of charged sheets information, consumable information, abnormality information, and product ID, is kept for reference as the most recent data indicating the mechanical conditions of the multifunction peripheral 200 at the time the multifunction peripheral 200 was last transferred. The user-set personal data stored in the power-supply-backed volatile storage device 225 of the multifunction peripheral 200 is also protected personal information that must be suppressed from being leaked to other users. This user-set personal data is erased either manually by the registered user or automatically by the multifunction peripheral 200 through a factory reset performed prior to transferring the multifunction peripheral 200.

The order information is an example of the non-free printing authorization information. The points information is an example of the free printing authorization information. The coupon information and the tutorial charge information are each an example of the device printing authorization information. The number of printed sheets history information is an example of the printing quantity information on a quantity already printed. The consumable order information is an example of the consumable order information. The account of the user, the order information, the points information, and the number of printed sheets history information are each an example of the user information. The product ID is an example of the individual information. The factory reset is an example of the information initialization. Contents in a service-related information table described later are an example of the service information. The erase-on-reset area 225*a* is an example of the first storage area. The preserve-on-reset area 225*b* is an example of the second storage area.

4. Processing Sequence During Normal Use and During Reconfiguration after a Reset Next, the processing sequence for various data and devices that occurs during normal use of the printing system 1 according to the present embodiment and when reconfiguring the multifunction peripheral 200 following a transfer of ownership will be described with reference to FIGS. 5 through 10. Note that various data and the like are included in each drawing according to need and omitted from others as appropriate.

Figure 5:
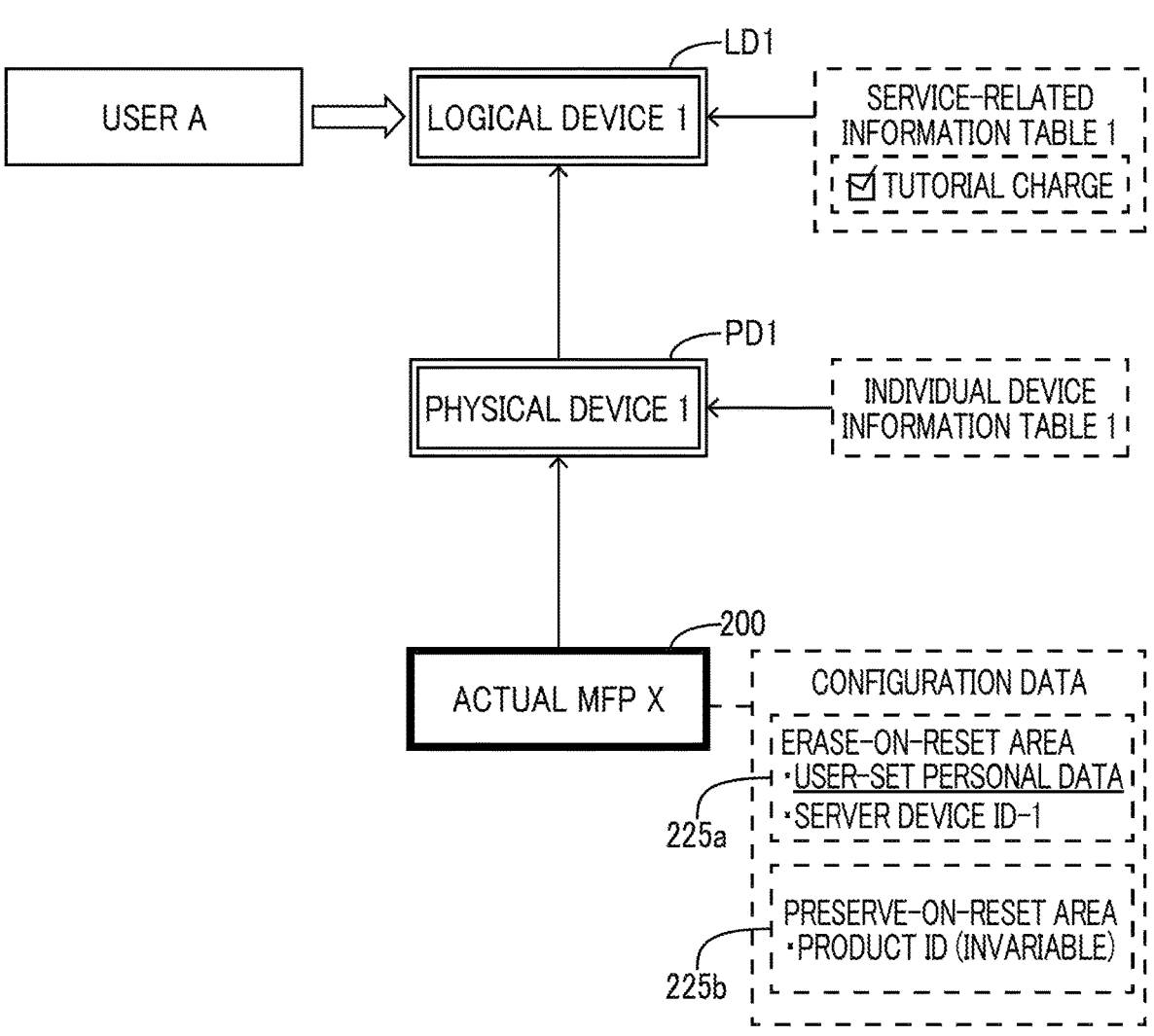
FIG. 5 is a view illustrating a state where an actual multifunction peripheral has been normally setup and a printing service is ready for use.

First, FIG. 5 shows the state of the printing system 1 whose printing service is ready for use. In this case, a multifunction peripheral 200 (referred to in the drawing as "actual multifunction peripheral X" to signify an individual multifunction peripheral) has been setup normally on the data processing server 100 and registered for service, thereby the printing service becoming ready for use. In this example, the actual multifunction peripheral X has been set to be affiliated with a setup including a physical device PD1 and a logical device LD1 in the data processing server 100. This example also assumes that the tutorial charge, which is a benefit provided for the initial purchase of the actual multifunction peripheral X, has already been applied. Therefore, a flag for the tutorial charge information, which is included in a service-related information table 1 referenced by the logical device LD1, has been set (a checkmark has been inserted into the box in the drawing).

Further, while omitted from FIG. 5, the product ID of the actual multifunction peripheral X and a server device ID-1 issued at the time of service registration have been recorded in an individual device information table 1 referenced by the physical device PD1. On the actual multifunction peripheral X, user-set personal data such as telephone numbers and e-mail addresses set by a user A and the server device ID-1 issued from the data processing server 100 at the time of service registration are recorded in the erase-on-reset area 225*a* of the power-supply-backed volatile storage device 225. Additionally, the product ID for the actual multifunction peripheral X is recorded in the preserve-on-reset area 225*b*.

While not shown in the drawing, the data processing server 100 in this state offers various types of paid charging plans that the user can select. For example, when user A selects one specific charging plan and issues an instruction to purchase and utilize that plan via the information terminal 300, an order process for that plan is started. Once user A has completed payment for this paid charging plan via the transaction server 400 separately, the remaining number of charged sheets information for the physical device PD1 is updated through the order process to increase by the number of sheets charged in the paid charging plan. The physical device PD1 (the data processing server 100) also transmits the number of charged sheets to the actual multifunction peripheral X affiliated with that physical device PD1. This method enables user A to order a paid charging plan of the user's choosing to charge (increase) the number of printable sheets on the actual multifunction peripheral X by the number of charged sheets corresponding to that paid charging plan.

Suitable processes are performed between the data processing server 100 and transaction server 400 to generate and manage the service points described above and to issue coupons based on their accumulation. Coupons, which are complimentary ordering privileges, are registered on the data processing server 100 so that the user can select the coupon as a type of charging plan. When the user applies a coupon, an instruction to charge with the number of sheets equivalent to the coupon's value is immediately issued to the logical device LD1 without waiting for payment. Subsequently, a flag (not shown) for the coupon information is set to indicate that the coupon has been used.

If user A intends to terminate use of the actual multifunction peripheral X for any reason, such as the purpose of transferring the actual multifunction peripheral X to another user, the user performs a prescribed operation in a dedicated application installed on the information terminal 300 to transmit a reset instruction targeting the actual multifunction peripheral X to the data processing server 100, as illustrated in FIG. 6. At this time, the reset instruction includes the product ID of the actual multifunction peripheral X to identify the target of the reset. Upon receiving this instruction, the data processing server 100 transmits an initialization command to the actual multifunction peripheral X instructing the actual multifunction peripheral X to perform a factory reset. In response, the user-set personal data and server device ID-1 in the erase-on-reset area 225$a$ of the power-supply-backed volatile storage device 225 are erased. However, the product ID in the preserve-on-reset area 225$b$ is not erased but is preserved, even if the main power to the actual multifunction peripheral X is turned off for a long period of time.

The actual multifunction peripheral X itself begins to execute this factory resetting process only when receiving the initialization command transmitted from the data processing server 100. Therefore, immediately after the reset, the data processing server 100 records which multifunction peripheral 200 an initialization command has been sent to and is now in a reset state to manage and ascertain the statuses, and continues to preserve the corresponding physical device PD1 and logical device LD1 and their respective referenced data. The reset status for each multifunction peripheral 200 is recorded in reference data of the corresponding physical device PD1, for example, or in a management table or the like not specifically shown in the drawings. While the factory resetting process on the actual multifunction peripheral X could fail under some circumstances, the data processing server 100 that transmitted the initialization command may not be able to recognize that this process failed. Therefore, the record indicating whether the multifunction peripheral 200 (i.e., the actual multifunction peripheral X in this example) is in a reset state also includes information indicating whether the data processing server 100 has transmitted an initialization command to that multifunction peripheral 200. The actual multifunction peripheral X to which an initialization command has been sent is then prohibited from accessing the service-related information table 1 of user A.

Figure 7:
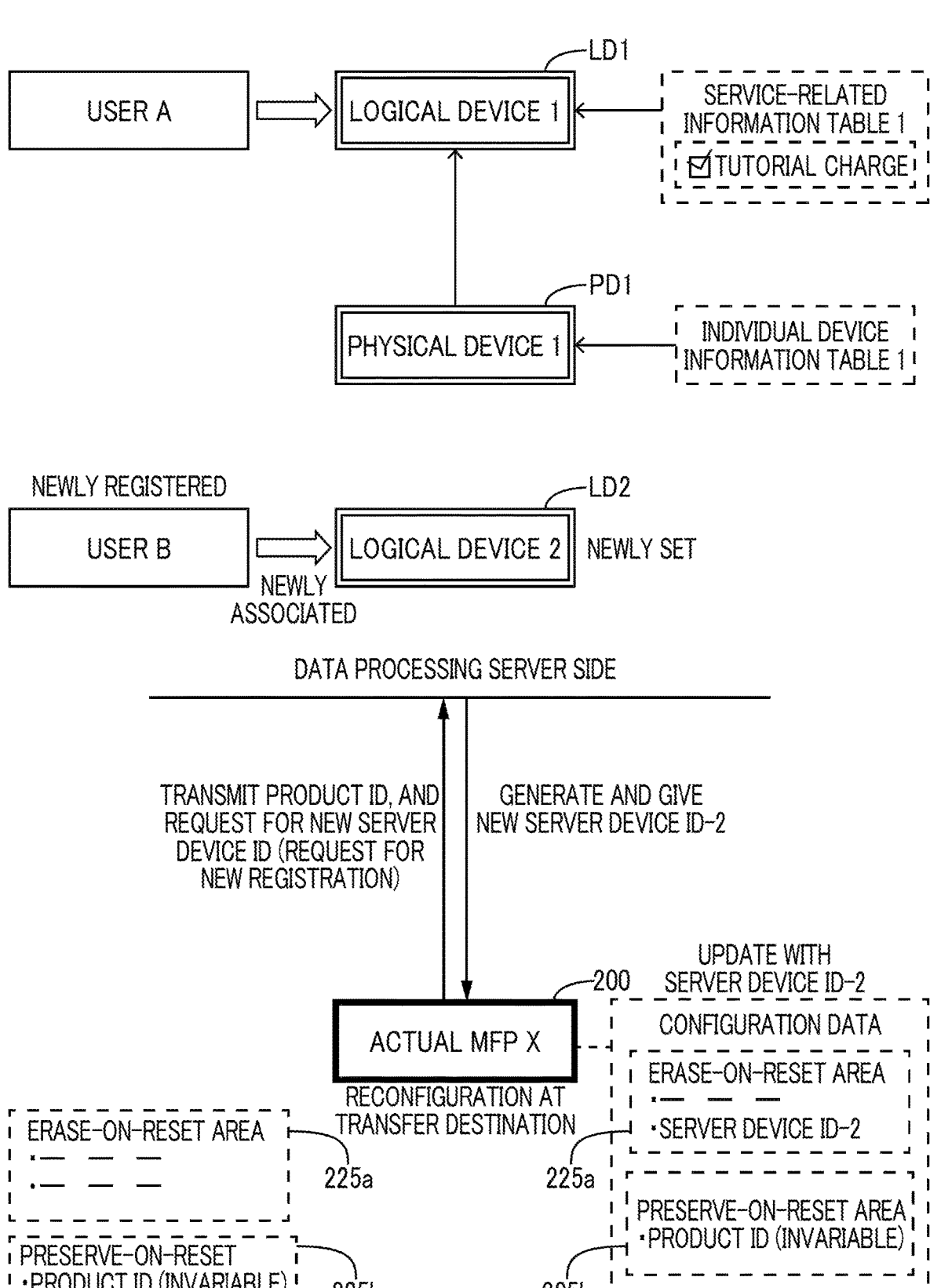
FIG. 7 is a view illustrating changes in data and in an association configuration when reconfiguration of the actual multifunction peripheral is performed after transfer of ownership of the same.

The process shown in FIG. 7 is subsequently performed to reconfigure the actual multifunction peripheral X at the transfer destination, for example. When the power to the actual multifunction peripheral X is first turned back on after the actual multifunction peripheral X was reset, the actual multifunction peripheral X performs an initial routine because a server device ID is not stored in the erase-on-reset area 225$a$. In this initial routine, the actual multifunction peripheral X accesses the data processing server 100 via the network NT, transmits the product ID recorded in the preserve-on-reset area 225$b$ to the data processing server 100, and requests the data processing server 100 to issue a new server device ID. If the actual multifunction peripheral X has failed to complete the factory resetting process in response to the initialization command received from the data processing server 100, on the other hand, the server device ID-1 is preserved in the erase-on-reset area 225$a$ without being erased therefrom. In such cases, the actual multifunction peripheral X accesses the data processing server 100 via the network NT using the server device ID-1 and the product ID when power to the actual multifunction peripheral X is resumed at the transfer destination. At this time, on the basis that information recorded on the data processing server 100 shows an initialization command was previously sent to the actual multifunction peripheral X, the data processing server 100 resends the initialization command to the actual multifunction peripheral X to have the actual multifunction peripheral X retry a factory reset. The reconfiguration process is executed once the second attempt at a factory reset is successful.

When the product ID and request to issue a new server device ID are received, the data processing server 100 processes the request as a new application to register for printing services. Specifically, the data processing server 100 generates a new unique server device ID-2 corresponding to this service registration. The data processing server 100 returns and gives the generated server device ID-2 to the actual multifunction peripheral X. Also, in response to this service registration the data processing server 100 configures a new logical device LD2 having a newly generated unique ID assigned thereto.

The multifunction peripheral X then overwrites with the new server device ID-2 received from the data processing server 100 in the erase-on-reset area 225$a$ to update the same. At this point, a new user B of the actual multifunction peripheral X can access the data processing server 100 via the information terminal 300 and can associate the user's account with the new logical device LD2 through authentication operations to verify the product ID or server device ID-2.

Figure 8:
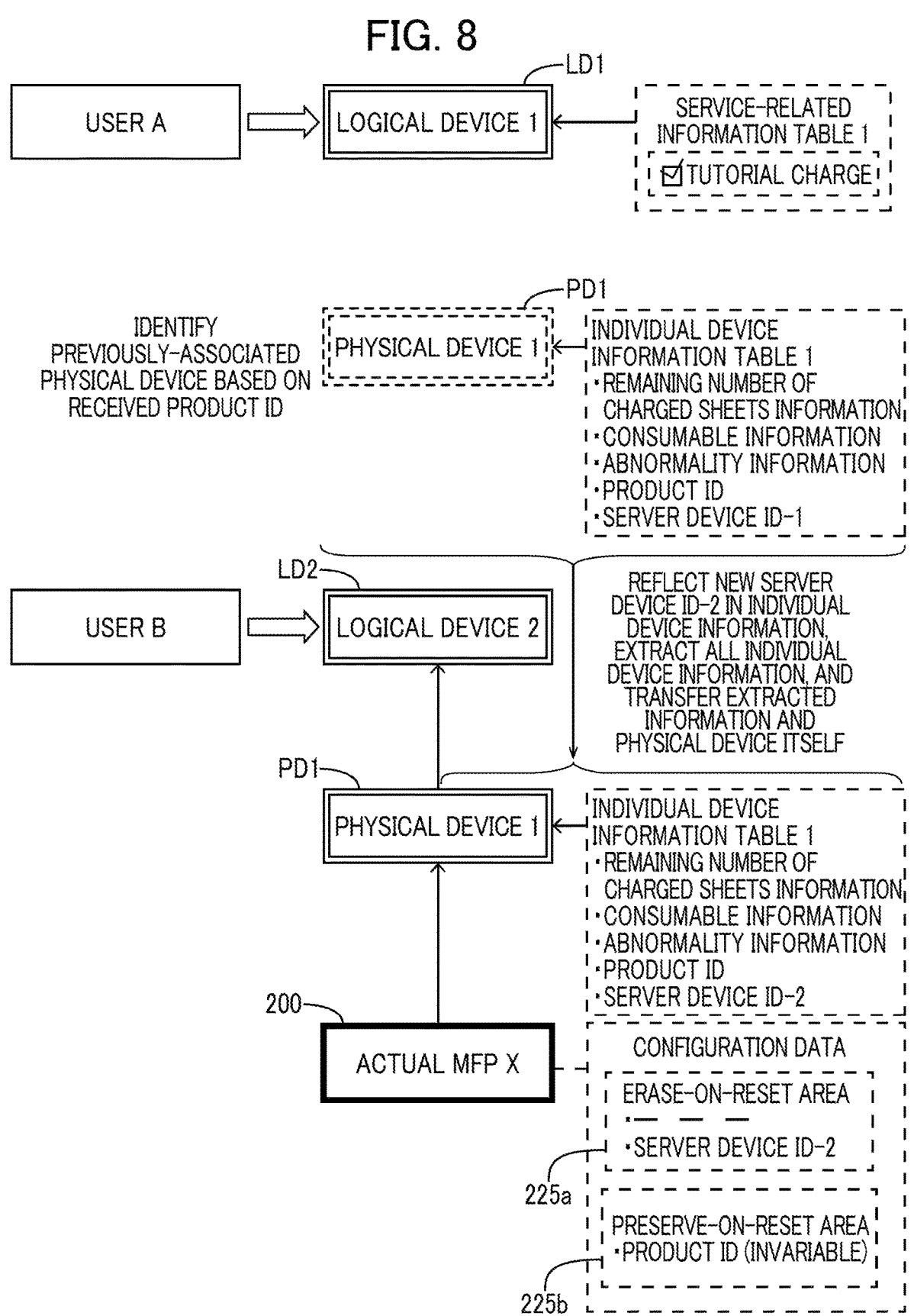
FIG. 8 is a view illustrating a state where the physical device is transferred to be affiliated with a new logical device in response to transfer of ownership of the actual multifunction peripheral.

Next, based on the product ID received from the actual multifunction peripheral X, the data processing server 100 identifies the physical device PD1 that has been associated with the previous service registration for the actual multifunction peripheral X, as illustrated in FIG. 8. With the exception of the server device ID, the data content in the individual device information table 1 referenced by this physical device PD1 is the most current information on the mechanical conditions of the actual multifunction peripheral X at this time. Accordingly, the entire data content of the individual device information table 1, along with the physical device PD1 itself, is extracted and transferred to be affiliated with the new logical device LD2, and the new server device ID-2 is reflected in the table as the server device ID. The data processing server 100 also sets the actual multifunction peripheral X to once again be affiliated with the physical device PD1. This process completely separates the actual multifunction peripheral X from the previous setup having the logical device LD1 and blocks access from the former user A.

Figure 9:
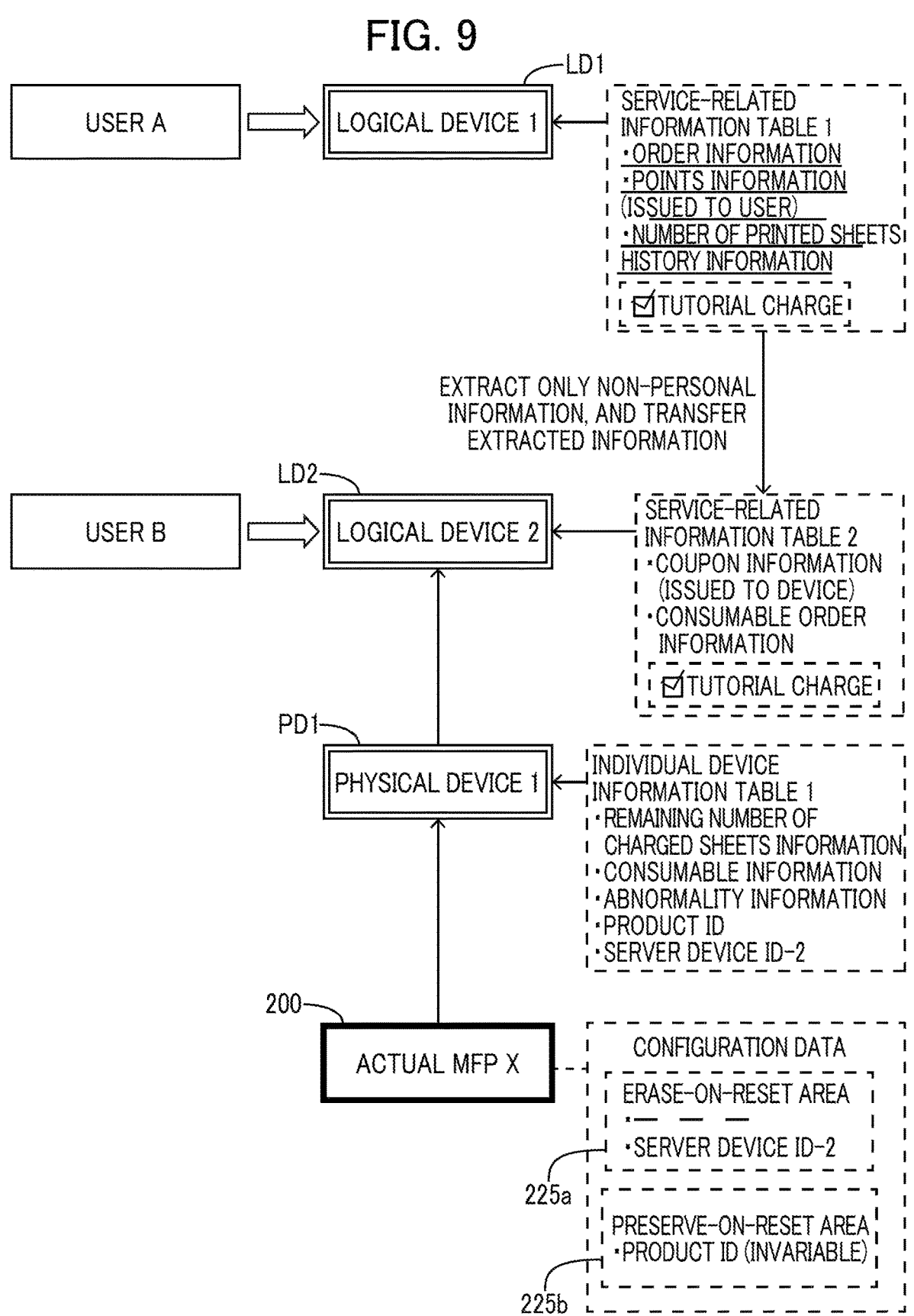
FIG. 9 is a view illustrating a state where only non-personal information is extracted from a former service-related information table and is transferred to be affiliated with a new logical device.
Figure 10:
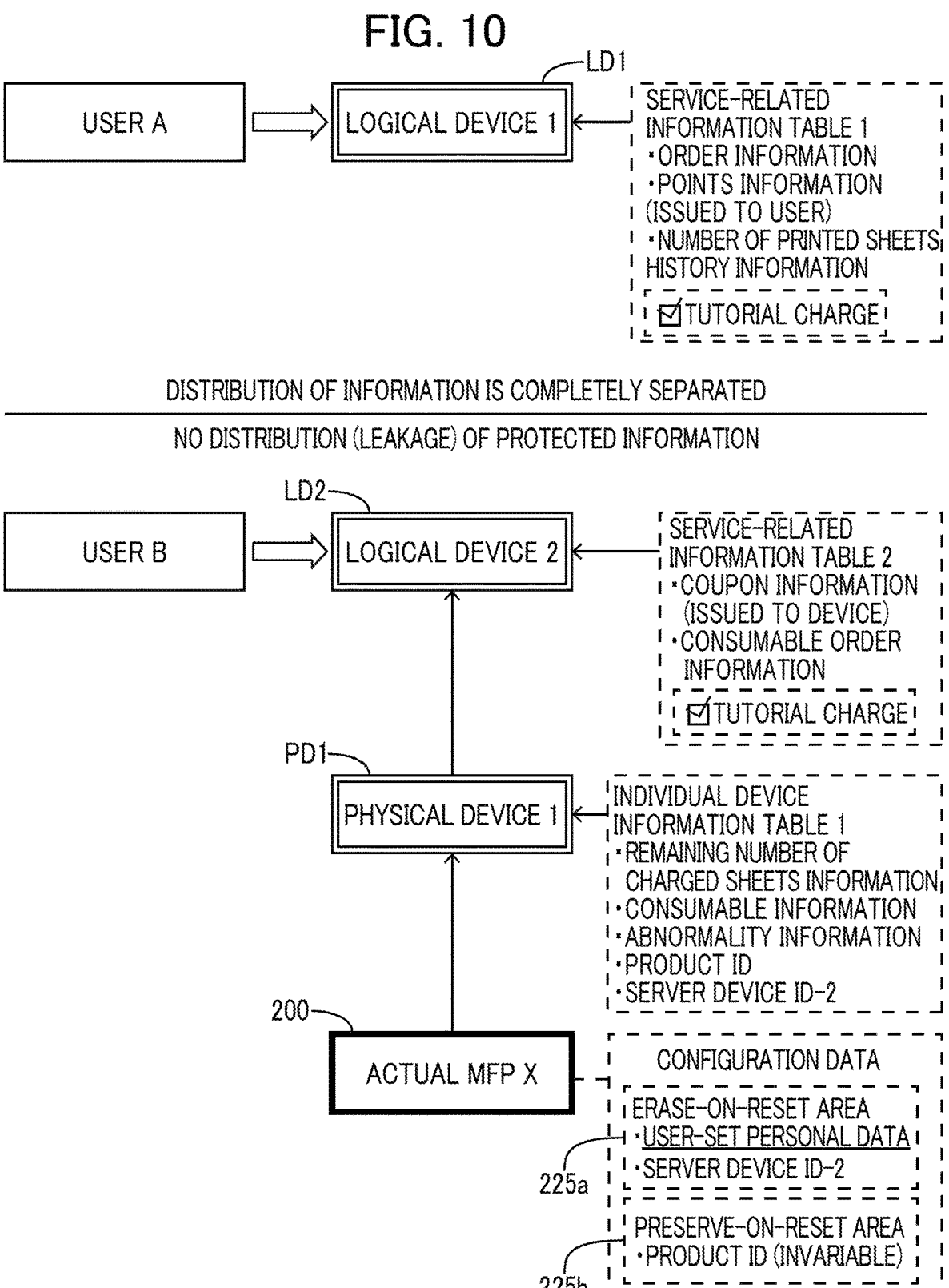
FIG. 10 is a view illustrating data and an association configuration when reconfiguration of the actual multifunction device has been completed after transfer of ownership of the same.

Next, of the data in the service-related information table 1 referenced by the preceding logical device LD1, device-issued coupon information (i.e., coupon information on coupons issued to the actual multifunction peripheral X) and consumable order information are extracted as data in a new service-related information table 2 to be referenced by only the user of the new logical device LD2, as illustrated in FIG. 9. As a result, the device-issued coupon information and consumable order information are no longer preserved in the service-related information table 1. However, other data in the service-related information table 1, such as order information, user-issued points information, and number of printed sheets history information, is preserved in the service-related information table 1 to be referenced by only the users of the logical device LD1. Only the tutorial charge information is stored in both the previous service-related information table 1 and the new service-related information table 2. As a result of executing the above sequence, the distribution of information to the previous user A of the actual multifunction peripheral X and the new user B of the same actual multifunction peripheral X is completely separated, suppressing the distribution (leakage) of protected information held by each.

The distinction between what data among the service-related information described above is extracted and transferred and what data is retained is determined according to the business model of the printing service. Specifically, all information targeted for retention, including order information associated with receipt data, user-issued points information issued based on the user's order purchasing history, and number of printed sheets history information related to the user's charging history should all be interpreted as the user's protected personal information for the corresponding service registration and should not be disclosed to users of other service registrations. However, information targeted for transfer, including device-issued coupon information issued only for an individual multifunction peripheral 200 and consumable order information in which the number of times of orders for consumables and the like is only applicable to the individual multifunction peripheral 200 in question, should be referenced in association with the individual actual multifunction peripheral X and must always be transferred and remain associated with that actual multifunction peripheral X. The tutorial charge information must be common to and preserved for any corresponding service registrations since the tutorial charge is set to only be applied once to the actual multifunction peripheral X.

Here, in the present embodiment, the user's protected personal information is retained so as to be referenced by the corresponding logical device LD for each service registration, while leakage of the protected information is suppressed. When a past user reregisters for a printing service on a new multifunction peripheral 200, the data processing server 100 can continue to apply the same data from the past service-related information. Further, information such as the services associated with an individual multifunction peripheral 200 is always transferred in a manner that only the physical device PD associated with that device can reference this information, thereby suppressing multiple users of different service registrations from concurrently using the same service. Further, the system also ensures that the one-time application of the tutorial charge is enforced, even if a user repeatedly registers for service for the same multifunction peripheral 200. Following the reset described above, user B, who is the new user of the actual multifunction peripheral X, can set or configure his or her own personal data through direct operations on the actual multifunction peripheral X and store this data in the erase-on-reset area 225a. This enables user B to utilize his or her personal data at any time on the actual multifunction peripheral X while suppressing external distribution (leakage) of such protected information.

The actual multifunction peripheral X is an example of the identified printing device. The user A is an example of the first user. The user B is an example of the second user. The logical device LD1 is an example of the first logical device. The physical device PD1 is an example of the specific physical device. The logical device LD2 is an example of the second logical device. The reset instruction targeting the actual multifunction peripheral X that the user transmits to the data processing server 100 is an example of the information initialization instruction. The process in which the data processing server 100 receives this reset instruction is an example of the (d) acquiring. The process in which the data processing server 100 outputs the initialization command to the actual multifunction peripheral X is an example of the (b) outputting. The process in which the data processing server 100 receives the product ID is an example of the (a) acquiring. The process in which the data processing server 100 prohibits the user B from accessing the service-related information table 1 of the user A is an example of the (c) prohibiting. The process in which the data processing server 100 associates the account of the user with the logical device LD is an example of the (e) registering. The process in which the physical device PD1 is extracted from the setup including the logical device LD1 and is transferred to be affiliated with the new logical device LD2 is an example of a set of the (f) discarding and the (g) establishing. The process in which the personal information in the service-related information table 1 of the user A is made invisible from the user B due to such transfer of the affiliation of the logical device LD is an example of the (h) correcting. The process in which information in the service-related information table 1 other than the personal information is associated with the logical device LD2 so as to be referenced thereby is an example of the (i) registering.

5. Effects of the Embodiment

As described above, the data processing server 100 provided in the printing system 1 of the present embodiment manages the multifunction peripheral 200 based at least on user information of the user of this multifunction peripheral 200. In a case where use of the actual multifunction peripheral X by user A is terminated (such as when the ownership of the actual multifunction peripheral X is transferred from user A to user B in the above example), the leakage of user information of user A is suppressed.

That is, the processor 110 of the data processing server 100 first acquires the product ID of the actual multifunction peripheral X targeted for reset. The processor 110 outputs an initialization command to the actual multifunction peripheral X identified by the acquired product ID. The initialization command is a command instructing the actual multifunction peripheral X to perform a factory reset for terminating use of the actual multifunction peripheral X by user A. In response to outputting the initialization command to the actual multifunction peripheral X, the processor 110 performs a process to prohibit both the actual multifunction peripheral X itself and a new user B of the actual multifunction peripheral X from accessing the service-related information table 1 of user A.

According to this embodiment, even when use of the actual multifunction peripheral X by user A that is the former user, is terminated and ownership of the actual multifunction peripheral X is transferred to user B that is the new user, this new user B cannot access the service-related information table 1 of the former user A. This suppresses the leakage of user information of the former user A to the new user B.

According to the present embodiment, even if the reset process on the actual multifunction peripheral X fails, leakage of user information of user A is suppressed provided that an initialization command has been outputted. Therefore, enhanced safety can be obtained in terms of security assurance.

Another feature of the present embodiment is that, when a reset instruction is issued from the information terminal 300 of user A, the data processing server 100 acquires the reset instruction. When this reset instruction is received, the processor 110 of the data processing server 100 performs a process to prohibit others (e.g., user B) from accessing the user information of user A.

According to the present embodiment, the data processing server 100 can perform a process to prohibit access to the user information of user A and suppress the leakage of such user information in response to instructions from user A before the actual multifunction peripheral X is transferred, or in response to instructions from user B after the actual multifunction peripheral X is transferred. Note that the reset instruction may also be transmitted to the data processing server 100 from the new user B.

Another feature of the present embodiment is that the processor 110 of the data processing server 100 manages the actual multifunction peripheral X by conceptually dividing the actual multifunction peripheral X into a physical device PD and a logical device LD associated with that physical device PD. The physical device PD is a concept associated with the product ID of the actual multifunction peripheral X. The logical device LD is a concept associated with service information (a service-related information table) for the provision of services utilizing the actual multifunction peripheral X. By the processor 110 performing a process to register a user, the account of at least one user is associated with the logical device LD that is associated with the service information.

For example, when user A terminates use of the actual multifunction peripheral X and transfers ownership of the actual multifunction peripheral X to a new user B, the physical device PD1 for the actual multifunction peripheral X is transferred. In this embodiment, the processor 110 of the data processing server 100 acquires the product ID of the actual multifunction peripheral X at the time of the transfer. The product ID is the ID associated with the physical device PD1 of that specific multifunction peripheral X.

When an initialization command has been outputted from the data processing server 100 to the actual multifunction peripheral X on the basis of the acquired product ID, the association between the physical device PD1 linked to the actual multifunction peripheral X and the logical device LD1 linked to user A is discarded, and in its place a new association is established between the physical device PD1 and the logical device LD2 linked to user B. Thus, the logical device LD associated with the physical device PD1 is changed from the logical device LD1 to the logical device LD2.

In the present embodiment, a process is performed to correct the service-related information table 1 rather than simply changing the association of the service-related information table 1 from the logical device LD1 to the logical device LD2. This correction process involves an appropriate process to make invisible (e.g., delete) at least content related to the user information of user A from the service-related information table 1 associated with the logical device LD1. The service information corrected in this correction process is then registered in association with the logical device LD2 in a service registration process.

When ownership of an actual multifunction peripheral X is transferred from user A to user B in the present embodiment, the data processing server 100 associates the physical device PD1 of the actual multifunction peripheral X with the logical device LD2 in place of the logical device LD1. The service-related information table 1 that has been associated with the logical device LD1 is then associated with the logical device LD2 as the service-related information table 2 after content related to user information of the user A in the service-related information table 1 is made invisible. Thus, when an actual multifunction peripheral X is transferred from user A to user B in the present embodiment, the service-related information table 1 in which content related to the user information of the user A has been made invisible is linked as the service-related information table 2 to the logical device LD2 which is newly associated with the physical device PD1. Since the user B cannot access the user information of the former user A, this embodiment can reliably suppress the user information of the user A from being leaked to the user B.

Another feature of the present embodiment is that the power-supply-backed volatile storage device 225 of the multifunction peripheral 200 has the erase-on-reset area 225*a* and preserve-on-reset area 225*b*, and that the product ID is stored in the preserve-on-reset area 225*b*, which is not erased even when information initialization (factory reset) is performed in response to an initialization command.

Since the product ID saved in the preserve-on-reset area 225*b* is not erased in this embodiment, the processor 110 of the data processing server 100 can reliably acquire this product ID.

Note that the server device ID stored in the erase-on-reset area 225*a* can be erased during the resetting process without causing any problems in the present embodiment. For example, while not shown in the drawings, if the multifunction peripheral 200 itself could execute the resetting process independently from the data processing server 100, the data processing server 100 would not be able to discern which multifunction peripheral 200 performed the resetting process at that time nor under which server device ID the actual multifunction peripheral X was registered at the time of the resetting process. Therefore, if a new registration application were received from an actual multifunction peripheral X that has a history of being registered under a plurality of server device IDs following a plurality of resetting processes in the past, for example, the data processing server 100 would not be able to determine which physical device PD corresponding to which server device ID should be passed on at this time. However, the data processing server 100 in this embodiment is capable of completely managing and discerning what multifunction peripheral 200 performed a resetting process and under what server device ID the multifunction peripheral 200 was registered at the time of the resetting process. Therefore, if the product ID can be obtained when a new registration application is received, the data processing server 100 can determine that the physical device PD corresponding to the service device ID under which the multifunction peripheral 200 corresponding to this product ID was registered at the last reset is to be passed on. Hence, it is not an issue for the server device ID to be deleted from the multifunction peripheral 200 during a reset.

Another feature of the present embodiment is that the service information in the service-related information table 1 includes at least one of the order information and points information. The order information describes orders that the user A has obtained by paying therefor, while the points information describes points awarded or granted to the user A free-of-charge. The order information and points information both includes content related to the user information for the user A. In the invisibilization process described above, content related to the user information in the at least one of the order information and points information associated with the logical device LD1 is made invisible.

When ownership of a multifunction peripheral 200 is transferred from the user A to the user B in the present embodiment, the at least one of the order information and points information from which content related to the user information of the user A has been made invisible is not associated with the logical device LD2 that is to be newly linked to the physical device PD1. Since the user B cannot access the user information of the user A, the leakage of the user information of the user A can be reliably suppressed.

Another feature of the present embodiment is that the service information in the service-related information table 1 includes at least one of the following: a set of coupon information and tutorial charge information, number of printed sheets history information, and consumable order information. The coupon information and tutorial charge information specify benefits granted to the actual multifunction peripheral X; the number of printed sheets history information indicates the amount of printing already performed on the actual multifunction peripheral X; and the consumable order information represents orders for consumables used in the actual multifunction peripheral X. None of this information includes content related to user information of user A. Note that in the present disclosure includes the phrase "at least one of A, B, and C" as an alternative expression that means one or more of A, B and C. In other words, the phrase "at least one of A, B, and C" in the present disclosure means "(A), (B), (C), (A and B), (A and C), (B and C) or (A, B and C)".

Therefore, the set of the coupon information and tutorial charge information, number of printed sheets history information, and consumable order information all are not made invisible in the invisibilization process, but rather are registered as is in association with the logical device LD2 in the service registration process.

According to this embodiment, the portion of the service information that is not related to user information can be reliably transferred as is to the new logical device LD2 without any modification.

The sequences of steps shown in FIGS. 5 through 10, and the like in the above description do not limit the present invention to the steps indicated therein. Steps may be added or deleted, or their order may be rearranged, without departing from the spirit and technical ideas of the invention.

The technique described in the embodiment and modifications described above may be suitably combined to be implemented.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An information processing apparatus comprising:
a communication interface configured to communicate with a printing device via a network, the printing device being configured to perform image formation on a printing medium; and
a controller configured to manage the printing device on the basis of user information of a corresponding user, the controller being further configured to perform:
(a) acquiring individual information identifying the printing device;
(b) outputting an initialization command to the printing device identified by the individual information acquired in the (a) acquiring, the initialization command being a command instructing the identified printing device to perform information initialization for terminating use of the identified printing device by a first user;
(c) prohibiting, in response to outputting the initialization command to the identified printing device in the (b) outputting, access to the user information of the first user from a second user different from the first user;
wherein the controller is further configured to manage the printing device by conceptually viewing the printing device as being divided into:
a physical device based on the individual information of the printing device; and
a logical device associated with both the physical device and service information about provision of a service related to the printing device,
wherein the controller is configured to further perform:
(d) registering one or more users in association with the logical device,
wherein the individual information acquired in the (a) acquiring is associated with the physical device related to the printing device, and
wherein the (c) prohibiting comprises:
(e) discarding an association established in advance between a first logical device and a specific physical device, the first logical device being the logical device related to the first user, the specific physical device being the physical device related to the identified printing device;
(f) establishing an association between a second logical device and the specific physical device, the second logical device being the logical device related to the second user;
(g) correcting the service information associated with the first logical device such that at least content related to the user information of the first user in the service information is made invisible; and (h) registering the service information corrected in the (g) correcting in association with the second logical device;

wherein the service information associated with the first logical device includes at least one of:

device printing authorization information related to a printing authorization granted to the identified printing device;

printing quantity information related to a quantity already printed on the identified printing device; and consumable order information related to consumables used in the identified printing device.

2. The information processing apparatus according to claim 1, wherein the controller is configured to further perform:

(i) acquiring an information initialization instruction issued by the first user or by the second user, and wherein, in response to acquiring the information initialization instruction in the (i) acquiring, the controller performs the (c) prohibiting.

3. The information processing apparatus according to claim 1, wherein the printing device includes a storage, the storage unit including:

a first storage area from which information stored therein is to be erased when the information initialization is performed according to the initialization command; and a second storage area from which information stored therein is not erased even when the information initialization is performed according to the initialization command, the second storage area storing therein the individual information, and wherein, in the (a) acquiring, the controller acquires the individual information stored in the second storage area.

4. The information processing apparatus according to claim 1, wherein the service information associated with the first logical device includes at least one of:

non-free printing authorization information related to a non-free printing authorization that the first user has acquired by paying therefor; and free printing authorization information related to a free printing authorization granted to the first user free of charge, and wherein, in the (g) correcting, content related to the user information of the first user in the at least one of the non-free printing authorization information and the free printing authorization information is made invisible.

5. The information processing apparatus according to claim 1, wherein, in the (g) correcting, none of the at least one of the device printing authorization information, the printing quantity information, and the consumable order information is made invisible, and wherein, in the (h) registering, the at least one of the device printing authorization information, the printing quantity information, and the consumable order information is registered in association with the second logical device.

6. A device management method for an information processing apparatus configured to manage a printing device on the basis of user information of a corresponding user, the printing device being configured to perform image formation on a printing medium, the device management method comprising:

(a) acquiring individual information identifying the printing device;

(b) outputting an initialization command to the printing device identified by the individual information acquired in the (a) acquiring, the initialization command being a command instructing the identified printing device to perform information initialization for terminating use of the identified printing device by a first user;

(c) prohibiting, in response to outputting the initialization command to the identified printing device in the (b) outputting, access to the user information of the first user from a second user different from the first user;

wherein the information processing apparatus is further configured to manage the printing device by conceptually viewing the printing device as being divided into:

a physical device based on the individual information of the printing device; and a logical device associated with both the physical device and service information about provision of a service related to the printing device, wherein the device management method further comprises:

(d) registering one or more users in association with the logical device, wherein the individual information acquired in the (a) acquiring is associated with the physical device related to the printing device, and wherein the (c) prohibiting comprises:

(e) discarding an association established in advance between a first logical device and a specific physical device, the first logical device being the logical device related to the first user, the specific physical device being the physical device related to the identified printing device;

(f) establishing an association between a second logical device and the specific physical device, the second logical device being the logical device related to the second user;

(g) correcting the service information associated with the first logical device such that at least content related to the user information of the first user in the service information is made invisible; and (h) registering the service information corrected in the (g) correcting in association with the second logical device;

wherein the service information associated with the first logical device includes at least one of:

device printing authorization information related to a printing authorization granted to the identified printing device;

printing quantity information related to a quantity already printed on the identified printing device; and consumable order information related to consumables used in the identified printing device.

* * * * *